US012636127B2

(12) United States Patent
Ghuge

(10) Patent No.: US 12,636,127 B2
(45) Date of Patent: May 26, 2026

(54) MANDIBULAR OR MAXILLARY DEVICES HAVING A POLYMERIC NANOCOMPOSITE ACTIVELY CONTROLLED FOR HARD PALATE OR MANDIBULAR GROWTH

(71) Applicant: Sleep Solutions of Texas, LLC, Tyler, TX (US)

(72) Inventor: Raghavendra Vitthalrao Ghuge, Tyler, TX (US)

(73) Assignee: SLEEP SOLUTIONS OF TEXAS, LLC, Tyler, TX (US)

( * ) Notice: Subject to any disclaimer, the term of this patent is extended or adjusted under 35 U.S.C. 154(b) by 104 days.

(21) Appl. No.: 18/628,289

(22) Filed: Apr. 5, 2024

(65) Prior Publication Data

US 2024/0335260 A1 Oct. 10, 2024

Related U.S. Application Data

(60) Provisional application No. 63/494,800, filed on Apr. 7, 2023.

(51) Int. Cl.
*A61C 7/10* (2006.01)
*A61C 7/00* (2006.01)

(52) U.S. Cl.
CPC ................ *A61C 7/10* (2013.01); *A61C 7/006* (2013.01); *A61C 2201/00* (2013.01)

(58) Field of Classification Search
CPC ........ A61C 7/10; A61C 7/006; A61C 2201/00
See application file for complete search history.

(56) References Cited

U.S. PATENT DOCUMENTS

| | | | | |
|---|---|---|---|---|
| 10,945,872 B2 * | 3/2021 | Hsu | .......................... | A61F 5/055 |
| 2020/0121493 A1 * | 4/2020 | Yukita | ..................... | A61F 5/566 |
| 2022/0257408 A1 * | 8/2022 | Kopelman | .............. | A61F 5/566 |
| 2022/0300083 A1 * | 9/2022 | Muse | ...................... | G10L 15/26 |

(Continued)

OTHER PUBLICATIONS

Bex et al., Growth hormone and bone health, Pubmed, 2003, 60 Suppl 3:80-6. doi: 10.1159/000074507.

(Continued)

*Primary Examiner* — Nicholas D Lucchesi
(74) *Attorney, Agent, or Firm* — FisherBroyles, LLP; Susan M. Oiler

(57) ABSTRACT

Medical devices have a polymeric nanocomposite treatment portion configured for contact with a treatment site within an oral cavity of a user and configured for operative communication with a controller. The polymeric nanocomposite treatment portion has a mucosal contact layer comprising a biocompatible polymer and defining a plurality of pores therethrough; a continuous support layer comprising a biocompatible polymer; an electronic network layer between the mucosal contact layer and the continuous network layer; and a means for applying pressure to the treatment site. The electronic network layer has carbon nanostructures and has a quantum micro-chiplet QMC or an octagonal quantum micro-chiplet integrated with a photonic integrated circuit. The electronic network layer is in operative communication with the controller and the power source. A pressure sensor that measures growth pressure is present and is positioned at the treatment site.

19 Claims, 8 Drawing Sheets

(56) References Cited

U.S. PATENT DOCUMENTS

| | | | | |
|---|---|---|---|---|
| 2023/0000665 A1* | 1/2023 | Ghuge | ................. | A61N 1/0548 |
| 2024/0335260 A1* | 10/2024 | Ghuge | .................... | A61C 7/36 |

OTHER PUBLICATIONS

Trippel, Potential role of insulinlike growth factors infracture healing, Clinical Orthopaedics and Related Research, Oct. 1998, pp. S301-S313, vol. 355.

Syed et al., Pulsed electromagnetic fields for the treatment of bone fractures, Bangladesh Med Res Counc Bull, Apr. 1999, pp. 6-10, vol. 25 issue 1.

Anthem BlueCross, Clinical UM Guideline Ultrasound Bone Growth Stimulation, Jul. 6, 2022, 12 pages.

International Search Report and Written Opinion, Application No. PCT/US2024/023178, Jul. 15, 2024, 8 pages.

International Search Report and Written Opinion, Application No. PCT/US2024/023209 Jul. 10, 2024, 7 pages.

* cited by examiner

152

167

166

158

156

10-100 micron   T1

10-1000 microns   T2

10-100 micron   T3

160

154

10-1000 microns

164

176

177

178

167

174

166

174

182

184

186

180

172

170

180

MANDIBULAR OR MAXILLARY DEVICES HAVING A POLYMERIC NANOCOMPOSITE ACTIVELY CONTROLLED FOR HARD PALATE OR MANDIBULAR GROWTH

RELATED APPLICATIONS

This application is a divisional of U.S. application Ser. No. 16/822,993, filed Mar. 18, 2020, granted as U.S. Pat. No. 11,666,478, which is a continuation-in-part of U.S. application Ser. No. 16/784,758, filed Feb. 7, 2020, granted as U.S. Pat. No. 11,666,477, which claims the benefit of U.S. Provisional Patent Application No. 62/936,032, filed Nov. 15, 2019, the entirety of which are both incorporated herein by reference.

TECHNICAL FIELD

This application relates to medical devices, in particular, mandibular teeth coverings or maxillary teeth coverings having a polymer nanocomposite portion positionable against the hard palate, the mandible, the sublingual space, the gums, individual teeth, and/or the buccal or lingual mucosa and in operable communication with a controller, wherein the polymer nanocomposite portion has interleaved carbon nanotube or carbon nanodot matrix layers and a matrix variable density polytetrafluoroethylene.

BACKGROUND

Many people suffer from an overbite, retrognathia, or an underbite, prognathism. Some undergo orthodontic procedures such as braces, expanders, spacers, etc. for correction thereof. Others go untreated.

The current orthodontic procedures have limitations. Palate expanders typically fail to realign teeth during the process and fail to promote growth of small teeth, gaps in the teeth can results. The current orthodontic procedures do not promote maxillary or mandibular bone growth, which increases the possibility of therapeutic reversal once the orthodontic devices are removed.

Additionally, in instances where a patient has experienced facial maxillary and/or mandibular fractures, bone healing is slow. The fractures can affect nutrition, since it is difficult to cat, growth of the bones and/or teeth, and speech. A device that can enhance healing and reduce the time of recovery would have numerous benefits.

There is a need to heal maxillary and/or mandibular fractures more quickly, especially in a non-surgical manner or to promote bone growth or tissue healing in the hard palate, mandible, the sublingual space, the gums, individual teeth, and/or the buccal or lingual mucosa.

SUMMARY

In all aspects, medical devices that have a polymeric nanocomposite treatment portion configured for contact with a treatment site within an oral cavity of a user are disclosed. The polymeric nanocomposite treatment portion is configured for operative communication with a controller and its structure includes a mucosal contact layer comprising a biocompatible polymer and defining a plurality of pores therethrough; a continuous support layer comprising a biocompatible polymer; an electronic network layer between the mucosal contact layer and the continuous network layer; and a means for applying pressure to the treatment site. The electronic network layer is in operative communication with the controller and the power source, and the electronic network layer includes carbon nanostructures, and a quantum micro-chiplet QMC or an octagonal quantum micro-chiplet integrated with a photonic integrated circuit. A pressure sensor is also present that is positioned at the treatment site. The pressure sensor is one that measures growth pressure. Such medical devices can be used to treat micrognathia, palatal abnormalities, hypoplastic palate, cleft palate, dental arch abnormalities, hypoplastic mandible, mandibular fractures, maxillary fractures, mucosal or gingival healing and many other conditions, even for orthodontic purposes, post-surgical repair, and bone regeneration. The system is used to promote supervised directional growth of maxilla, mandible, hard palate, teeth, and soft tissue.

In one embodiment, the polymeric nanocomposite treatment portion is a palatal patch configured for direct connection to a surface of the user's oral cavity.

In all aspects, the medical device can include an oral cavity anchoring body having a housing enclosing a controller and a power source in operative communication with the controller. The oral cavity anchoring body can be a tooth covering, a maxillary teeth covering, a mandibular teeth covering, a gingival covering, a covering over the face and/or lips having the polymeric nanocomposite treatment portion insertable in the oral cavity in contact with an intraoral surface, an endotracheal tube. In one embodiment, the polymeric nanocomposite treatment portion extends from the oral cavity anchoring body.

The support lay of the polymeric nanocomposite treatment portion can be a matrix variable density polytetrafluoroethylene. A secondary support layer can be present between the mucosal contact layer and the electronic network layer. The secondary support layer can include a matrix variable density polytetrafluoroethylene also. In one embodiment, the layers of the polymeric nanocomposite treatment are 3D printed layers.

The means for applying pressure can be a motor driving an actuator, an electromagnetic force driven cable system, or a fluid-tight bladder and fluid dispenser system. In other embodiments, the means for applying pressure can be removably, replaceable sequentially sized and shaped teeth covering, a manual turnkey-wire system, a rotational motor activating wires arranged for radial expansion of the palatal arch, or radial wires integrated into one of the layers of the polymeric nanocomposite treatment portion.

The electronic network layer can include one or more of a sensor module, an electromagnetic field module, robotics module, an intravascular ultrasound module, and a vacuum module. The sensor modules include one or more of a capacitive micromachined ultrasonic transducer (CMUT), a complementary metal-oxide-semiconductor (CMOS) based sensor, an infrared sensor, a fiberoptic sensor, a radioisotope sensor, a temperature sensor, and a pressure sensor.

The layered structure of the polymeric nanocomposite treatment device also includes one or more of a sensor module, an electromagnetic field module, a CMUT module, UV emitting module, robotics module, an intravascular ultrasound module, and a vacuum module as a discrete layer interleaved by juxtaposed layers of carbon nanostructures positioned above or below the electronic network layer. Here, each discrete layer is in operative communication with the electronic network layer.

In one embodiment, the oral cavity anchoring body is removably, replaceably attachable to the polymeric nanocomposite treatment portion and includes a connection plug or port for connection to the electronic network layer of the polymeric nanocomposite treatment portion.

3

4

In a secondary aspect, methods of promoting bone growth in the oral cavity are disclosed. The methods include seating a medical device as described herein in a user's oral cavity, sensing pressure at the treatment site and sending the sensed data to a controller, and activating, via the controller, the means for applying pressure at the threshold amount of bone growth. The sensing and activating are in a repeatable feedback loop in communication with the controller, and the controller is configured to activate the means for applying pressure when the sensed data equals a pressure indicative of a threshold amount of bone growth.

The medical device and methods form a synchronized system for rapid and effective healing with better and faster results and restoration back to normal life and functionality. This self-contained system includes an energy source, onboard memory and processing, ability to communicate with an external controller station and cloud through WIFI or the like, and optional AI and machine learning robotics. The system will use a combination of CMUT, EMF, PEMF, hormonal therapy, UV rays, antibiotics, and mechanical pressure application along with the optional AI and robotics to guide changes in therapeutics.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present system.

DETAILED DESCRIPTION

Figure 1:
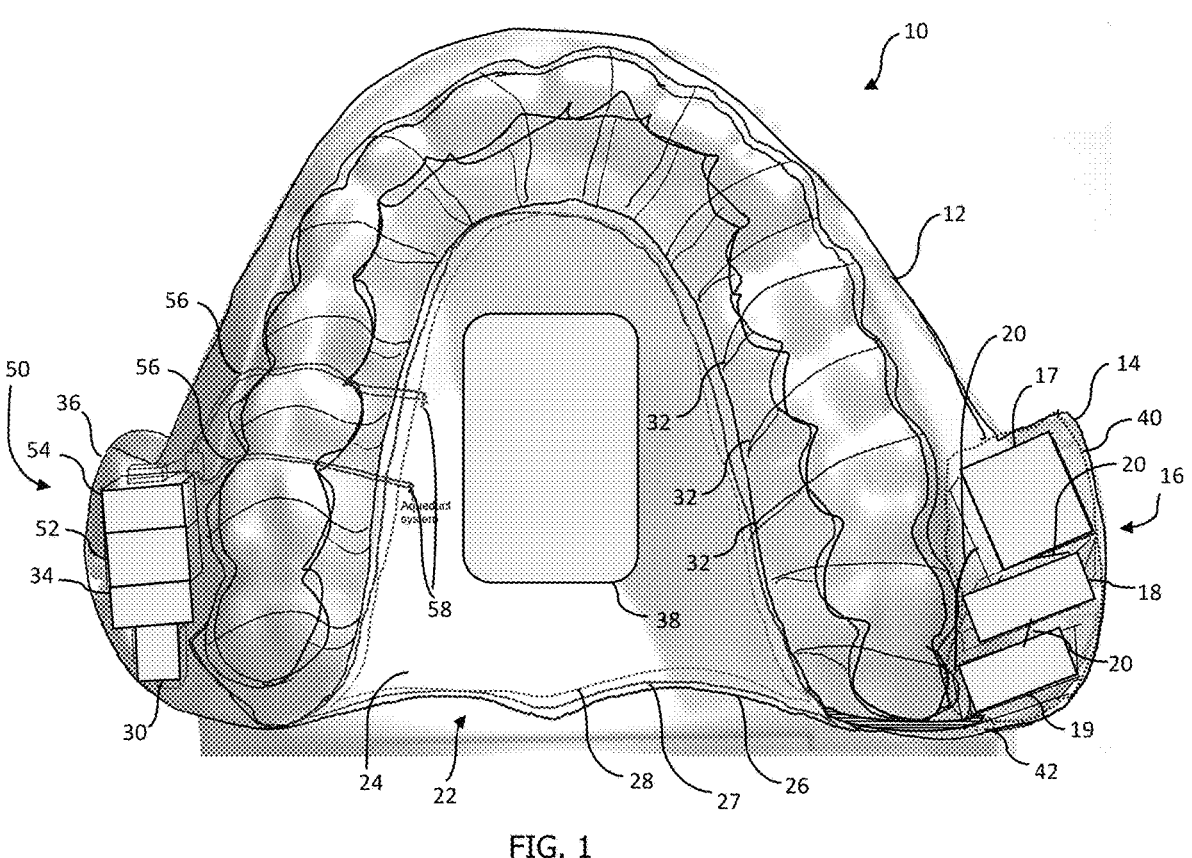
FIG. 1 is a bottom view of a first embodiment of a medical device that has a polymeric nanocomposite treatment portion.

The following detailed description will illustrate the general principles of the invention, examples of which are additionally illustrated in the accompanying drawings. In the drawings, like reference numbers indicate identical or functionally similar elements.

While the examples discussed herein are for maxilla, hard palate, or soft palate, this is meant to be exemplary and non-limiting. The device can be shaped to rest against any bone in in the oral cavity in need of repair or assisted growth for dental purposes, including, but not limited to, prognathism and/or retrognathism corrective growth, correction of dental misalignment, closed fractures, compound fractures, non-displaced fractures, displaced fractures, fractures with hardware used to stabilize bones, soft tissue injury, tendon injury, cartilage injury, post-surgical repair, bone regeneration, and any orthodontal purpose including orthodontal surgery. The device may also be used to treat enamel hypoplasia, treacher-collins syndrome, down's syndrome patients for growth of the oral cavity to match macroglossia, sleep apnea, gingival or oral mucosal disease, delivery of medications or other treatments, radiation therapeutics, radiation diagnostics, diagnosis and treatment of asthma, and treatment of insulin dependent diabetes.

As used herein, "fluid" means any liquid, suspension, colloid, gas, plasma, or combinations thereof.

Referring now to a first embodiment shown in FIG. 1, a medical device 10 has one example of an oral cavity anchoring body 12 (a maxillary teeth covering) that includes a housing 14 enclosing a controller 16, which includes a computer processing unit 17, a power source 18, and interconnects and/or other modules 19, in operative communication with the controller 16. The operative communication can be facilitated by any form of electrical connection, represented by lines 20. The medical device 10 has a polymeric nanocomposite treatment portion 22 configured for contact with a treatment site within a user's oral cavity and in operative communication with the controller 16. In FIG. 1, the polymeric nanocomposite treatment portion 22 is shown to be a palatal covering 24 that extends from the interior base of all the teeth to cover at least the hard palate. The palatal covering 24 can cover a smaller area than shown in FIG. 1 or a larger area including a portion of the soft palate. In FIG. 1, the palatal covering 24 extends from the maxillary teeth covering and is an integral portion thereof. In another embodiment, even the teeth covering or a portion thereof can include the polymeric nanocomposite treatment material. As such, the polymeric nanocomposite treatment material can cover the teeth, the gums, and the palate if required for the selected treatment. Such an extensive covering portion may be required when an injury affecting the oral cavity is severe enough to require the oral cavity to be temporarily held closed for initial healing.

In another embodiment, the palatal covering 24 can be a separate piece that is anchored independently to the palate, which may instead be referred to as a palatal patch. In one embodiment, the palatal patch is adhered to the palate by a biocompatible adhesive. In another embodiment the polymeric nanocomposite treatment portion can be placed surgically submucosally, against a bone, covering a bone, proximate a bone, or subcutaneously.

Figure 2:
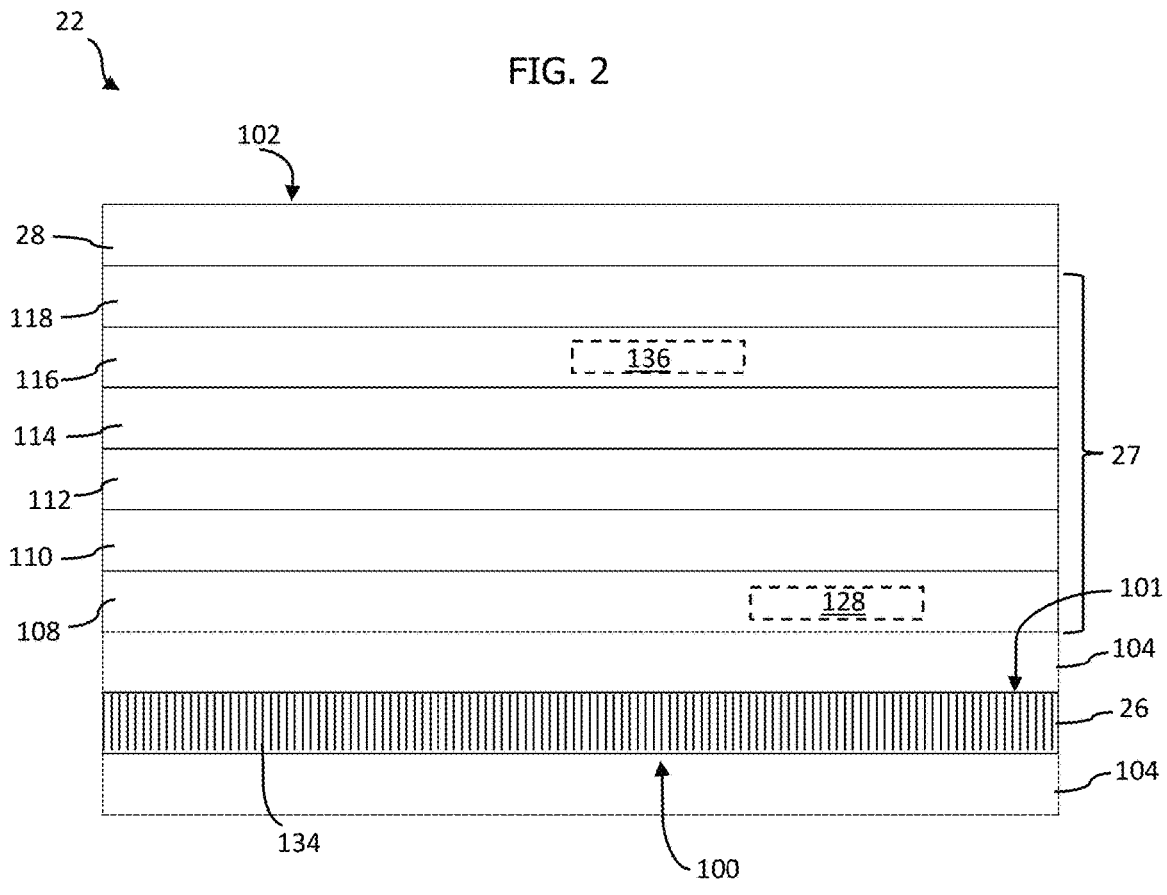
FIG. 2 is a cross-sectional representation of a first embodiment of a polymeric nanocomposite device.

With reference to FIGS. 1 and 2, the polymeric nanocomposite treatment portion 22 includes a mucosal contact layer 26 comprising a biocompatible polymer and defining a plurality of pores therethrough (shown in FIG. 2 as reference 134), a continuous support layer 28 comprising a biocompatible polymer, i.e., no pores are present in this layer, an electronic network layer 27 between the mucosal contact layer 26 and the continuous network layer 28, and a means of applying pressure 29 to the treatment site. The pores in the mucosal contact layer 26 can range in size from 1 μm to 3000 μm in diameter or width. In one embodiment, the mucosal contact layer 26 is a mesh, which can have a shape and size configured to fit the palate of the user. The range of palate sizes in humans may vary by gender, age, and race but may have a length ranging from 20 mm to 40 mm and a width ranging from 20 mm to 40 mm. The porosity of the mucosal contact layer 26 is such that the electronic network layer 27 can treat the treatment site through the pores thereof. The electronic network layer 27 is in operative communication with the controller 16 and a power source, which can be the same power source 18 as the controller or an independent power source 30. The electronic network layer 27 has carbon nanostructures, and a quantum micro-chiplet QMC or an octagonal quantum micro-chiplet (OQMC) integrated with a photonic integrated circuit 34. The QMC or OQMC 34 can be built into the electronic network layer 27 or can be stored inside housing 36 of the polymeric nanocomposite treatment portion in operative connection to the power source 30. The photonic integrated circuit 34 can include non-transitory memory for storage of data, algorithms, artificial intelligence, etc.

Still referring to FIG. 1, the medical device 10 includes a pressure sensor 32 positioned at the treatment site. In the embodiment of FIG. 1 there is a pressure sensor 32 positioned relative to each tooth, but it can be any number of selected teeth, even just one tooth, or a bone within the oral cavity, including the hard palate, depending on the needs of the user. If the treatment site is the hard palate, a pressure sensor 32 will be positioned accordingly. Each pressure sensor 32 is configured to measure growth pressure. The communication from the sensor can be wired or wireless. Each pressure sensor 32 can send data to the controller 16 or to the QMC or OQMC 34. The pressure sensor(s) can be any commercially available pressure sensor or herein-after developed pressure sensors. In one embodiment, the pressure sensor(s) are each an f-carbon dot nanoparticle-based hydrogel, more specifically a dot nanoparticle (f-CD) mixed with polyvinyl alcohol and catechol-conjugated chitosan in the form of a hydrogel as taught by Professor Ryplida of the Department of Green Bio Engineering of Korea National University of Transportation in the Republic of Korea. Information about how much pressure is being applied by various tissues will be recorded and used in AI algorithms to control the application of pressure by the pressure application system 38.

The pressure sensor 32 can be built into the medical device 10 or can be independently mounted in the user's oral cavity. As noted above, the pressure sensor(s) 32 can communicate via a wired connection or a wireless connection to a controller, a controller station, the integrated circuit, or even a smart device.

Figure 10:
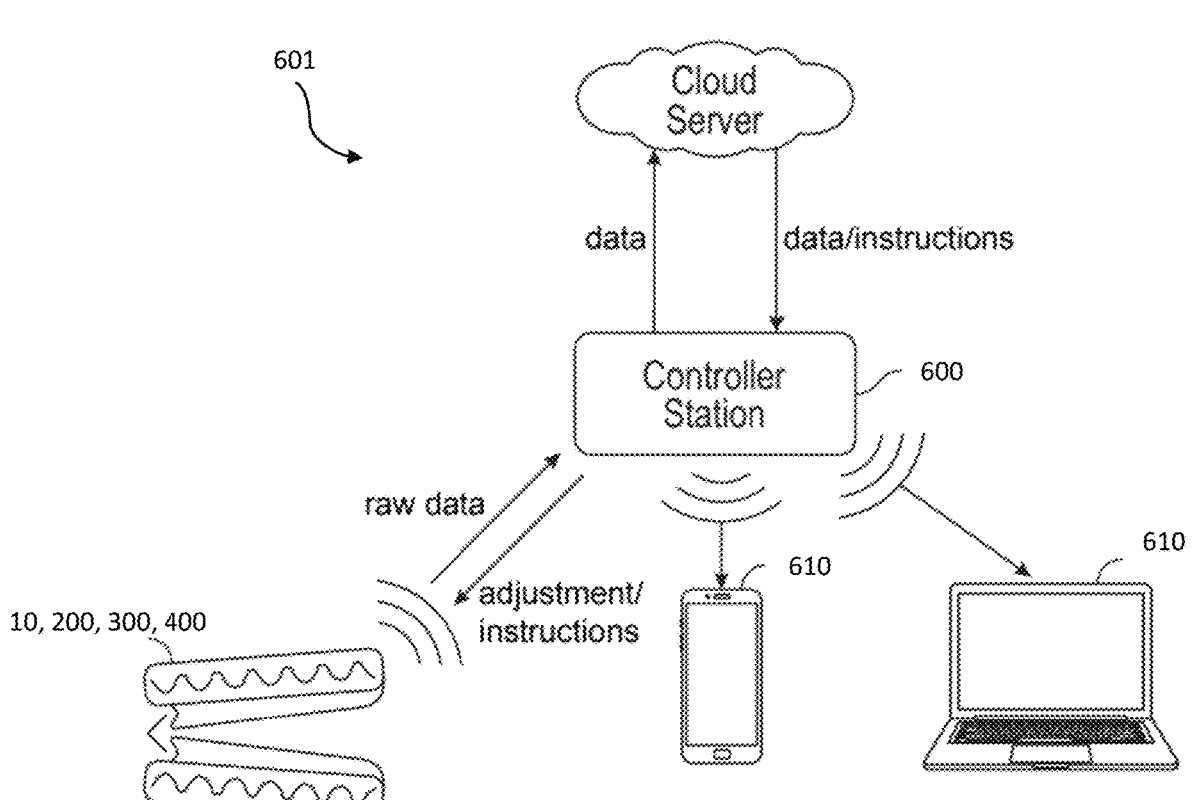
FIG. 10 is a schematic representation of a network system communicating with the medical devices disclosed herein.
Figure 11:
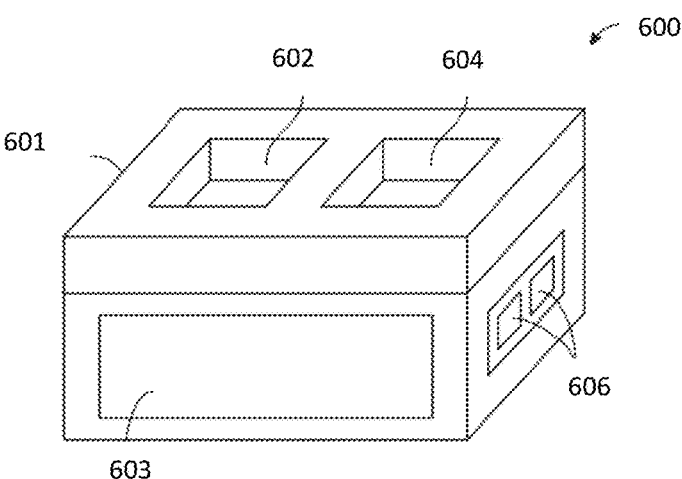
FIG. 11 is a representation of one embodiment of a controller station with battery charging receptacles for a medical device.

Referring again to FIG. 1, as represented by the dotted line 40 around the controller 16, the controller 16 can be removably, replaceably attachable to the oral cavity anchoring body 12. In this variation, the oral cavity anchoring body 12 includes a connection plug or port 42 for connection to the other electronic components, such as sensors 32 or the electronic network layer 27. In FIG. 1, the controller 16 is part of the medical device 10 and is present inside the oral cavity of the user. In other embodiments, the controller 16 can be located outside the oral cavity, carried on the user's body, present as a controller station as shown in FIGS. 10 and 11 in proximity to the user, or the controller can be connected to the medical device 10 through communication via the internet, all of which can be through any known or herein-after developed wireless communication.

The controller 16 houses power source 18, a microprocessor or computer processing unit 17, which can include (i) non-transitory memory, (ii) a QMC/PIC, (iii) software that can include artificial intelligence programming, (iv) a cellular chip for transmitting data/signals and receiving data/signals, (v) an EMF processor, (vi) a CMUT processor, and (vii) a CMOS sensor processing unit, (vii) a medication dispensing control system, (ix) an optical digital or fiberoptic receiver and transmitter, (x) an infra-red imaging controller, (xi) a pump controller for vacuum and/or suction systems, or (xii) combinations thereof. The controller 16 can include a charging port or a charging plate (not shown) in an exterior surface thereof for charging and recharging the power source 18 when it is a rechargeable battery. The controller 16 can include ports configured to repeatedly, replaceably connect to external dispenser systems, a source of radiation, such as UV radiation and/or a LASER, or IV infusion systems, just to name a few non-limiting examples.

The power source 18, 30 can be a replaceable battery, such as a non-rechargeable or a rechargeable battery. In one embodiment, each power source is one or more rechargeable batteries. The rechargeable batter may be a lithium-ion battery. In one embodiment, the lithium-ion battery is a nanoscale battery using a carbon-based material such as those available from Chasm a company headquartered in Canton Massachusetts. In another embodiment, the controller is configured to recharge the power source or power the power source based on transfer of body heat and/or static electricity of a user's body through the carbon nanostructure of the polymeric nanocomposite treatment portion. This is possible through "Power Felt" thermoelectric technology developed by Wake Forest University's Center for Nano-technology and Molecular Materials. Another energy source could be transfer of electrons from human saliva in oral cavity (with or without combination with body heat) to the carbon nanoparticles. The carbon nanotubes are held in flexible plastic fibers that are made to feel like fabric.

Additionally, the polymeric nanocomposite treatment portion 22 can be removably, replaceably attachable to the oral cavity anchoring body 12 (or independent therefrom as discussed above). This feature can be useful as growth is achieved and a new teeth covering for example, is necessary for the user. In other embodiments, the polymeric nanocomposite treatment portion 22 can be integral with the oral cavity anchoring body 12. For example, the medical device may have molded components, and/or 3-D printed layers and/or components that render the polymeric nanocomposite treatment portion 22 integral with the oral cavity anchoring body 12.

Still referring to FIG. 1, the medical device 10 can include a dispensing system 50. The dispensing system can be one that dispenses an active chemical to the treatment site or one that dispenses or retracts a fluid as a means for applying pressure to or reducing pressure on the treatment site. The dispensing system 50 includes a reservoir 52 in fluid communication with a dispenser 54 and one or more conduit 56 leading from the dispenser to the treatment site or to an inflatable diaphragm or balloon that is positioned relative to the treatment site. The dispensing system 50 in FIG. 1 is illustrated as one for dispensing an active agent stored in the reservoir 52. Each conduit 56 terminates with an open duct 58 in the electronic network layer 27, which will communicate with the palatal mucosal via one or more pores in the mucosal contact layer 26. The active agent can be a medication, vitamin, imaging agent, etc. In one embodiment, the active agent is a collagen carbon dot nanocomposite as described in co-pending Patent Application No. 63/494,794, filed Apr. 7, 2023. Rather than having the dispensing system in housing 36 of FIG. 1, the dispensing system can be built into one of the layers of the polymeric nanocomposite treatment portion 22 (see FIG. 2) as described in co-pending Patent Application No. 63/494,799 (bone fracture).

The dispenser 54 can include a dispensation aqueduct system for aerosolized or liquid or gaseous therapeutic medications or testing materials or radioactive material or sealed compressed gas or liquid. The medical device 10 is configured to collect data from sensors and feedback from mechanical systems for storage in on-board memory and/or for transmission thereof to a controller station and to proprietary software at a remote location, such as the controller discussed below with respect to FIG. 10 or 11 or the electronics disclosed in Applicants granted U.S. Pat. No. 11,484,435, which is incorporated herein by reference in its entirety.

The dispenser 54 or the electronic network layer 27 of the polymeric nanocomposite treatment portion can includes a means for activating an activate agent, such as a source of radiation, such as UV light, a source of heat, a LASER, or whatever else is required to activate certain active agents. In another embodiment, the dispenser 54 includes a feedback loop sending a signal to an on-board or external controller 34, 16 upon dispensing an active agent to activate a secondary means of activation, whether included in the medical device 10 or external to the medical device.

Turning now to FIG. 2, the layers of the polymeric nanocomposite treatment portion 22 will be discussed in detail. The mucosal contact layer 26 defines a mucosal contact surface 100 and the continuous support layer 28 defines an outermost surface 102 opposite the mucosal contact surface. The support layer 28 is preferably flexible, having enough flexibility to conform to a user's palatal surface, gums, teeth, cheeks, sublingual surfaces, or other surfaces within the oral cavity. The electronic network layer 27 is sandwiched therebetween and can include a plurality of layers from 108 to 118. These layers are shown in the cross-section but are not limited to the specific order represented in FIG. 2. Instead, the sequence of layers can be different and/or some layers may be optional, which is application and treatment dependent. Variation in the sequence of the layers 108 to 118 provide freedom for planning locations of conduits, channels, electrical connections, sensors, etc.

The mucosal contact layer 26 and the support layer 28 are made of biocompatible polymers. Suitable biocompatible polymers include those polymers that are ISO 10993 assigned/certified by FDA. For example, Biomedical Resin by Formlabs and Dental Resin by Formlabs. These particular resins can be 3-D printed and are approved for prolonged oral use. The ISO 10993 certification includes not only the material, but the printing, washing, and curing procedures for said materials. Other polymers commonly used in dentistry are suitable, such as:

polyethylene (PE) [—(CH$_2$—CH$_2$)],
polymethyl methacrylate (PMMA) [—{CH$_2$—C(CH$_3$)—CO—OCH$_3$}—],
polycarbonate (PC) [—{O—(CO)—O}—],
polyethylene glycol (PEG) [—{CH$_3$(O)—CH$_3$(O)}—],
polydimethylsiloxane [—{(CH$_3$)$_2$—Si—O}—],
polyurethane (PUR) [—(NH—COO)—],
polylactic acid (PLLA) [—{O—CH(CH$_3$)—O}—],
poly(e-caprolactone) (PCL) [—{CO(CH$_2$)$_5$—O}—],
polypyrrole (Papy) [—{CH$_4$H$_5$—N}—],
hexamethyldisilane (HMDC) [—{C$_6$H$_{19}$—N$_5$—Si$_2$}—],
N-isopropylacrylamide [—{C$_6$H$_{11}$—NO)}—], N-tert-butyl acrylamide [—{C$_7$H$_{13}$—NO)}—], and hydrogel [—{C$_3$H$_3$—NaO$_2$)}—].

Although the mechanical properties of these biomaterials are dictated by their bulk properties, their tissue biomaterial interactions are governed by their surface properties which can be easily tailored to specific requirements, for example by application of polymer coatings that increase the biocompatibility thereof.

Each of the layers 108 to 118 can be interleaved by a structural matrix comprising one or more of carbon dots (CDs), carbon nanotubes (CNTs), shape memory alloys (SMAs), and shape memory polymers (SMPs). Interleaving such layers in the device provides equal tensile strength in all direction allowing the shape memory alloys or shape memory polymers to be used, if present, to adjust stiffness or elastic properties of the final product or to function as one of the means of applying pressure. The ratio of SMAs or SMPs with a variety of glass transition temperatures or shape transition temperatures allow the creation of varying degrees of stiffness. The carbon nanotubes or carbon dots can define integrated circuits configured to provide processing of data in real time and transmission of data to a circuit or computer in operative communication therewith, such as a mobile phone, the internet, a tablet, a computer, or mobile or dedicated app technology stored in any appropriate means of technology.

As discussed above, the mucosal contact layer 26 has a plurality of pores 134 therethrough, which accommodate the delivery of treatment from the electronic network layer 27 to the treatment site. The electronic network layer 27 can deliver heat (i.e., provide warming or cooling), air, ultrasound, pressure, an electromagnetic field (steady state or pulsed), radiation, chemicals, drugs, infrared photography, oxygen concentration monitoring, blood flow monitoring, or a combination thereof to the target site.

Still referring to FIG. 2, interior layer 108 is an interstitial layer configured to carry hardware, such as tubes, wires, vacuum channels, pressure channels, ducts for communication with the pores 134 of the mucosal contact layer 26, including for suction or dispensing of fluids. This layer can be made of or includes a matrix variable density polytetrafluoroethylene (PTFE) layer. A matric variable density PTFE is one that contains variable customizable ratios of e-PTFE, d-PTFE, n-PTFE. e-PTFE has larger pores, d-PTFE is dense and has sub-micron pores, and n-PTFE is highly dense. d-PTFE is used in bone and tissue regeneration, and n-PTFE is used in grafts. The matrix variable density PTFE can have e-PTFE to d-PTFE in a ratio in a range of 4:1 to 1:4. Layer 108 can have a thickness in a range of 10 μm to 1000 μm, more preferably 20 μm to 100 μm.

Layer 108 can include a bladder 128 in fluid communication with a source of fluid, such as the reservoir 52 of the dispensing system 50 disclosed in FIG. 1. In one embodiment, the fluid is air, water, or a saline solution. The bladder 128 can be in the form of a flexible diaphragm, a balloon, a plastic pouch, integrated nanotube/nanodot cavity or the like.

One or more of the tubes can be configured to function as a natural drain. One or more of the tubes can be in fluid communication with a pump (not shown) to withdraw fluid, i.e., forming an aspirator system. The aspirator system can include an injector for introduction of a saline solution to flush the treatment site and an aspirator to withdraw the contents flushed by the saline solution. A dispensing system similar to that disclosed in FIG. 1 can be present to introduce the saline solution and then suction up the flushed contents. The pumps, aspirators, controller, and valves are connected to measurement sensors that provide continuous feedback to the controller which regulates the precise volume, pressure and other properties of the dispensed materials and is in operative communication with the treatment site so as to acquire information about the desired outcome and execution of each and every action.

Layer 110, an optional layer, when present comprises the quantum micro-chiplet or an octagonal quantum micro-chiplet integrated with a photonic integrated circuits (QMC/PIC or OQMC/PIC). Such QMC chips and PIC circuits have been developed by the Massachusetts Institute of Technology. A QMC emits single-photon pulses that are routed and manipulated by photonic integrated circuits. Layer 110 can be in the form a diffuse or focal matrix of such chips and circuits configured to regulate and control precise delivery and recovery of data and products. Layer 110 is in operative communication with a second QMC/PIC in a controller 16 of the medical device 10 shown in FIG. 1. QMCs are available from Zhonghe Quantum Technology (Hunan) Co., Ltd. The formation of the OQMC is described in detail in co-pending Patent Application No. 63/494,799, which is incorporated herein by reference in its entirety.

Layer 112 can be a thermal sensory layer/regulatory, which has the primary function of regulating temperature at the treatment site, such as the temperature of a bone, muscle, tendon, cartilage, skin, etc. Regulating temperature includes measuring the temperature at the treatment site, and heating or cooling the treatment site to maintain the treatment site at a preselected temperature at which healing is maximized. The temperature is measured using a sensor suitable for monitoring temperature and the data collected by the sensor is in electrical communication with a transmitter, an integrated circuit and/or other electronics that receives the data and can activate the heating or cooling function. This layer can also include pressure sensors. The pressure sensors in this layer can be the same or different from the pressure sensors discussed above with respect to sensing growth pressure.

Layer 114 comprises at least one frequency sensor and/or deliver systems. The frequency sensor can be one that senses optical frequencies and/or photonic frequencies. Example sensors include a capacitive micromachined ultrasonic transducer (CMUT), a complementary metal-oxide-semiconductor (CMOS) based sensor, infrared sensor, fiberoptic sensor, radioisotope sensor, and other radiation sensors. The CMUT may be in the form of a micromillimeter circular disc(s), terminals at predetermined locations, or a tubular distribution as disclosed in co-pending Patent Application No. 63/494,799. This layer will be insulated from the exterior layers, to avoid the external environment from interfering with the sensors.

The pressure sensors and doppler ultrasound data from the CMUT sensors are useful to detect arterial blood flow and tissue perfusion, thereby early detection of onset of venous/cavernous vein thrombosis, which can have lethal consequences such as stroke. Graphene CMOS sensor doped with lead sulfide (PBS) placed in layer 114 will be configured to measure optical and color transformation of hemoglobin in red blood cells. Signals from a graphene CMOS sensor doped with lead sulfide (PbS) can be received by the controller and the controller is configured to use this information to detect tissue oxygen levels, which will be configured for use as a measure of tissue viability, for early detection of tissue necrosis and hypoxemia and thereby provide time for intervention.

Layer 116 is configured to produce an electromagnetic field (EMF), which may be a pulsed EMF if desired. The EMF is provided to the treatment site for the promotion of healing to the bone, soft tissue, and/or skin. The application of the EMF can be constant or pulsed, and optionally for intermittent time periods. The EMF pulse is generated by an EMF electronic module 136 and is delivered locally through individual tubes. This pulse can have varying strengths applied through various tubes and various pores of the mucosal contact layer. In another embodiment, carbon nanotubes in the interleaved layers can be used to generate and configured to deliver electro-magnetic energy to target tissue site. The carbon nanotubes can be positioned diffusely (over the entire area) or focally targeted to specific tissue in localized areas. In another embodiment, the EMF can be controllably applied by instruction to or from the EMF electronic module 136, the electronics within housing 36 of the polymeric nanocomposite device 22, or the controller 16 of FIG. 1. EMF locally enhances circulation, oxygen delivery promotes ingress of growth promoting factors, tissue growth, cellular multiplication, and is configured to promote rapid healing (faster than normal healing rates).

Still referring to FIG. 2, layer 118 is a connectivity layer comprising electrical leads or carbon nanostructures positioned to connect with the other layers, with the QMC/PIC or OQMC/PIC of layer 110, with the on-board sensors, and/or with the controller. Such connectivity is provided by conventional electrical, electronic, low voltage methods in one embodiment and/or carbon nanostructures (CDT's/CNT's). The circuits for these structures may be conventionally manufactured or may utilize 3D printing with resins that contain carbon nanostructures (CNT's/CDT's) or utilize prior art methods from industrial circuit board printing that utilize 3D printing such as described by Dassault Systems Solid Works corporation. The various layers of this device (invention) may entirely be printable using 3D printing or may be assembled on an assembly line using a combination of manufacturing methods for individual layers.

Each layer can be manufactured using additive printing, which includes 3D printing. Here, one layer at a time can be printed and the next on top thereof, etc. 3D printing refers to the transformation of a digital CAD (Computer-Aided Design) file by a 3D printer into a three-dimensional physical solid object or part, i.e., the 3D printer "translates" the CAD file into a 3D model. The 3D printer typically does this by depositing material layer by layer in precise geometric shapes using a printhead, nozzle, or other printing technology. Each layer can be considered a thinly sliced cross-section of the final object being built. In another embodiment, the layers can be manufactured by subtractive manufacturing methods. Subtractive manufacturing includes the controlled removal of material, for example, by milling, etching, machining, etc. In yet other embodiments, a hybrid approach may be taken as well (some materials by additive printing and others using other technologies).

Optionally, with reference to FIG. 2, the polymeric nanocomposite treatment portion 22 can include an active layer 104 positioned on the mucosal contact surface 100 of the mucosal contact layer 26 or positioned on the interior surface 101 of the mucosal contact layer 26. The active layer 104 includes a collagen carbon dot nanocomposite that is carrying an active agent. The collagen carbon dot nanocomposite can be absorbable through the oral mucosa. Herein any reference to the active agent as being absorbable is meant to include the collagen carbon dot nanocomposite and vice versa because it is this nanocomposite that is tagged with said active agent. The active layer 104 of the mucosal patch 100 may interact with the oral mucosa to open inter-cellular pores, open intracellular or trans-cellular absorption mechanisms, or generate carrier-facilitated transfer of chemicals or biological materials across the mucosa into the blood stream. The details of the active layer 104 are disclosed in copending Patent Application No. 63/494,799, filed on the same day and which is incorporated herein by reference in its entirety.

Figure 3:
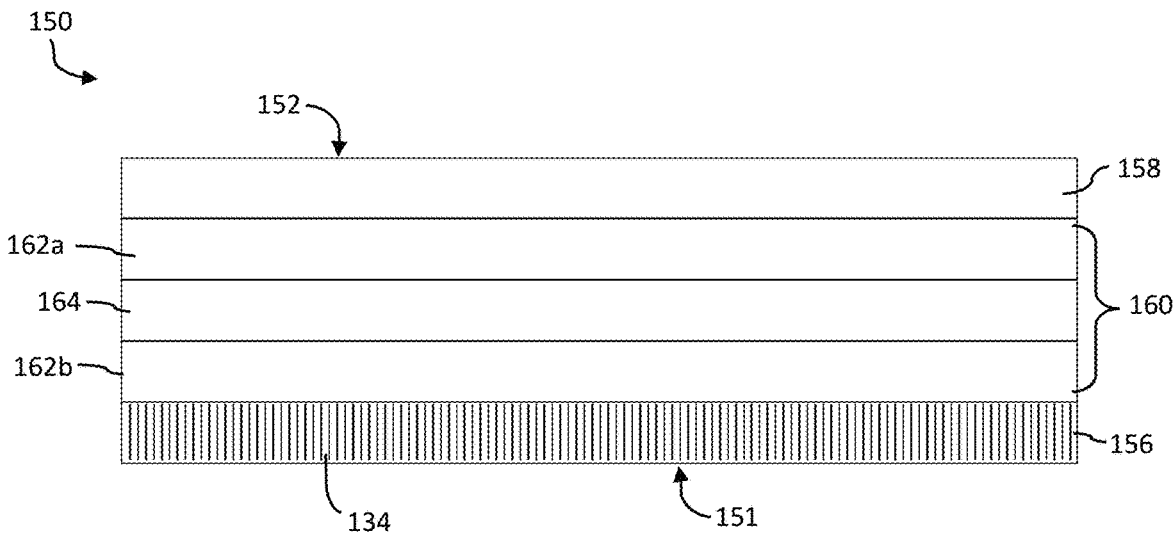
FIG. 3 is a cross-sectional representation of a second embodiment of a polymeric nanocomposite device.
Figures 4, 5:
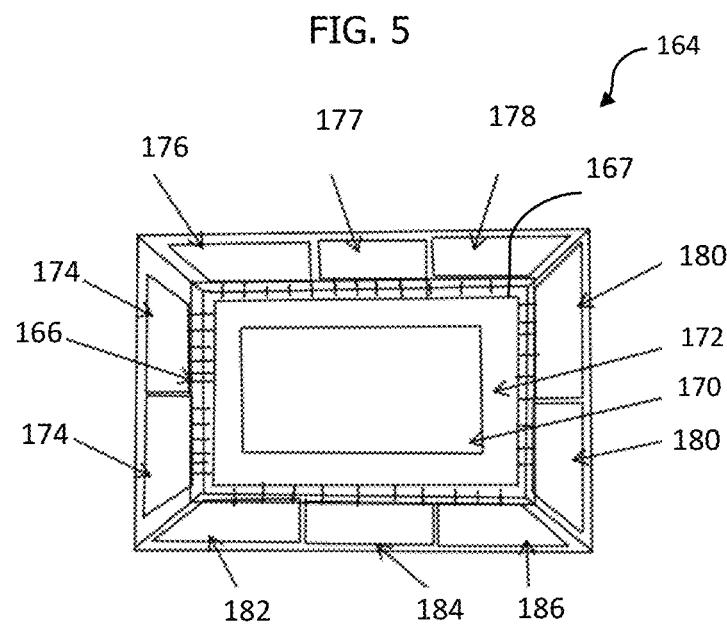
FIG. 4 is a side perspective view of the second embodiment of the polymeric nanocomposite device.
FIG. 5 is a top plan view of the network matrix layer of the second embodiment of the polymeric nanocomposite device.

Turning now to FIG. 3, a second embodiment of a polymeric nanocomposite treatment device 150 is shown that has a layered construction having a mucosal contact layer 156 defining a mucosal contact surface 151 and a support layer 158 defining an outermost surface 152, both layers comprising a biocompatible material. The layered construction includes a layer of carbon nanostructures 162a, 162b juxtaposed respectively one to the mucosal contact layer 156 and the other to the support layer 158, and an electronic network layer 164 between the two layers of carbon nanostructures. The electronic network layer 164 sandwiched between the layers of carbon nanostructures 162a, 162b is collectively referred to as a network matrix 160. With reference to FIG. 4, the mucosal contact layer 156 has a first thickness (T1) that is typically in a range of 10 μm to 100 μm, the network matrix 160 has a second thickness (T2) that is typically in a range of 10 μm to 1000 μm, and the support layer 158 has a third thickness (T3) that is in the same range as T1.

In this embodiment, in contrast to the embodiment of FIG. 1 where discrete layers can have discrete functions, any combination thereof can be included in the electronic network layer 164. With reference to FIGS. 4 and 5, the electronic network layer 164 is represented as having an integrated circuit base 166 with a core processor 167 that includes a quantum micro-Chiplet (QMC) or octagonal quantum micro-Chiplet (OQMC) 170 and a photonic integrated circuit 172. The integrated circuit base 166 can be a graphene sheet, carbon nanostructures, matrix variable density PTFE, a shape memory hybrid polyimide based on polyhedral oligomeric silsesquioxane (thermoset), cellulose, a 3-D printable resin, or an aluminum nitride sheet. In one embodiment, the integrated circuit base 166, in whatever shape is desired or required by design configured for terminal functionality of product, is stamped with the QMC or OQMC (configured to precisely fit inside the shape of integrated circuit base) or has the same glued thereto. Then, another layer selected from the material identified for the integrated circuit base 166 is stamped to the other surface of the QMC or OQMC or is glued thereto to create a sandwich (SM-OMC-SM). This can then be placed as the core 167 in FIGS. 4 and 5. In another embodiment, these layers can be 3-D printed. If the matrix variable PTFE is selected for the integrated circuit base 166, it can be painted (3D or by other methods) over the QMC/PIC or OQMC/PIC to a desired thickness.

Arranged in electrical communication with the core processor 167, via the integrated circuit, are one or more power sources 174, a plurality of modules, controllers, inputs/outputs, etc. For example, a first control module 176 is configured to receive inputs from sensors, such as temperature and pressure sensors and send outputs based thereon to operate mechanical components or systems of a medical device in which the same are incorporated, a second control module 177 is configured to receive inputs from sensors indicating operation of a mechanical component, such as the dispenser, and send outputs based thereon to operate said mechanical component, a third control module 178 is configured to receive inputs from another sensor and send outputs based thereon to whatever mechanical component or system is in need thereof. A controller and/or emitter of CMUT and/or IVUS 180 can be present. A source of electromagnetic fields 182 (pulsed or non-pulsed) can be present. A module for infra-red, fiberoptic, radio isotope sensory inputs 184 and command/signal outputs to mechanical components, radio-isotope activation energy source, UV, EMF/PEMF, CMUT, CMOS, optical energy delivery through fiberoptics or signal delivery to activate other can be present. A robotics controller 186 can be present for sending outputs to mechanical components or robotic systems (including those with machine learning computer system/artificial intelligence) in need thereof. Each of these examples are in electrical and operative communication with the core process 167.

Figure 8:
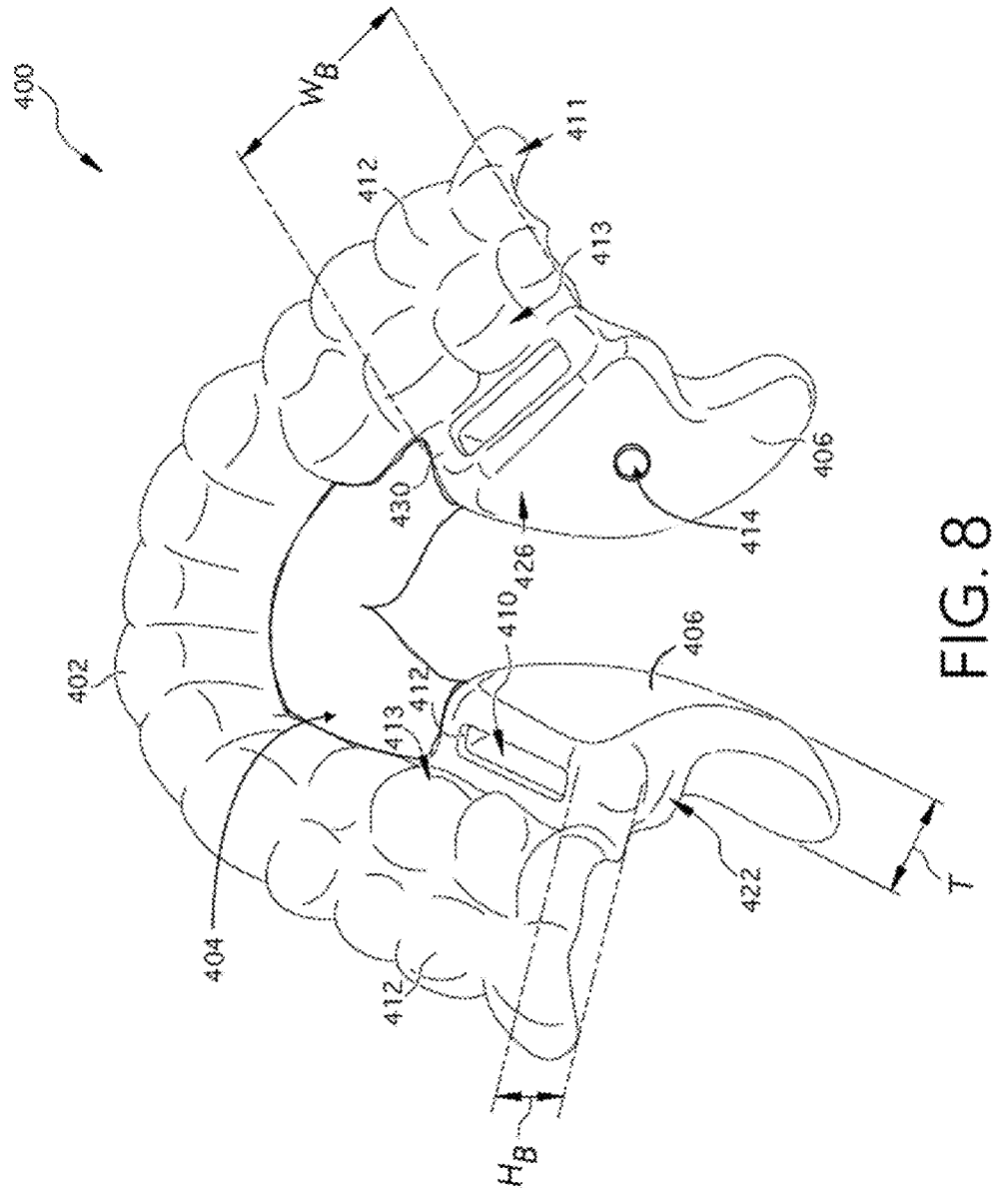
FIG. 8 is an example of a second embodiment of a medical device that has a polymeric nanocomposite treatment portion.

Looking back to FIG. 1, the oral cavity anchoring body 12 is shown as a maxillary teeth covering. In FIG. 8, a medical device 400 is shown in which the oral cavity anchoring body is a mandibular teeth covering 402 that has a sublingual-shaped polymeric nanocomposite treatment portion 404. In this embodiment, there are two housings 406 that are fin shaped bodies extending downward and posteriorly, which have a thickness (T). The fin shaped bodies are hollow, thereby defining an internal cavity 410 in which a sensor may be operatively positioned and have an opening 412 providing access to the internal cavity 410 and one or more apertures 414 for electronic components that need access to the external environment. The sensor, not shown, but described above, can have a sensing end positioned in one of the apertures 414. The details of the shape of the housings 406 are described in co-pending U.S. Patent Application Publication No. 2023/0390103, which claims priority to U.S. Provisional Application No. 63/350,006 filed on Jun. 7, 2022, which is incorporated herein by reference in its entirety. The molar portion 112 of the mandibular tooth covering 402 has a posterior surface 411 and 422, a left and right postero-medial surface 113, and a base 430 of each lingual flange 406, which has a width (WB) and a height (HB). The anchoring body is not limited to being a teeth covering.

In other embodiments, the anchoring body can be a single tooth covering, one that covers two or more teeth without covering them all, a wire bracket that fits around one or more teeth, a biocompatible adhesive, a gingival (buccal/lingual surface) covering, a covering over the face or lips that is configured to be in operative communication with intraoral surfaces, anchored to a tube such as an endotracheal tube or any other external device that is configured to be in operative communication with the palate or sub-lingual surface configured to provide therapeutic or diagnostic function.

Means for Applying Pressure

Figures 6, 7:
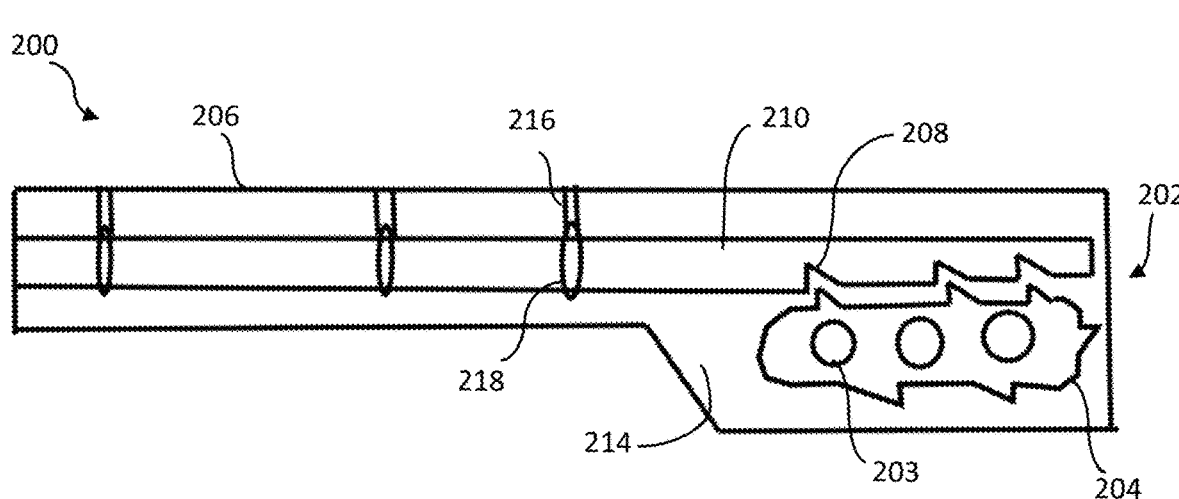
FIG. 6 is an example of a first embodiment of a pressure application device.
FIG. 7 is an example of a second embodiment of a pressure application device.

Turning now to FIGS. 6 and 7, pressure application system 38 (FIG. 1) includes a means to apply pressure to the treatment site, which is regulated or adjusted based on a feedback loop of pressure sensor data from pressure sensor(s) 32. Regulating pressure includes measuring the pressure applied by the treatment device 200 at the treatment site, and adjusting the pressure applied to the treatment site by the pressure application system 38 to maintain the treatment site at a preselected pressure at which healing or growth is maximized. Pressure sensors 32 are discussed above. The data collected by the pressure sensor 32 is in electrical communication with a transmitter, an integrated circuit, or other electronics that receives the data and can activate the pressure application system 38. The data can be recorded or stored in memory of an onboard computer processing unit or stored utilizing blockchain technology and/or sent to the cloud/internet and then can be used in AI algorithms to optimize or execute functions.

Turning now to FIG. 6, a first embodiment of a pressure application system 200 illustrates a combination system for pressure application, but either of the systems described below can be present alone as well. The first aspect of the pressure application system 200 is a mechanically activated motor driven cog system 202 that engages cogs 208 in a strip or cable 210 connected directly or indirectly to the treatment site. In this example, a mandibular or maxillary tooth or buccal gingival covering 206 has the strip or cable 210 mounted thereto or built therein. The motor driven cog system 202 includes a motor (not shown) inside a housing 214, such as housing 14 in FIG. 1, operatively connected to shafts and wheels 203 to drive a cog-toothed belt 204. The motor can be a piezo electric motor, and EMF motor, or any other standard type of motor of suitable size to fit in the housing. The cog-teeth of the cog-toothed belt 204 engage cogs 208 in the strip or cable 210 to advance the strip or cable to apply pressure to the treatment site. The cog-toothed belt is made of biocompatible material, which may include rubber or an elastomer. The strip or cable 210 can be made of titanium metal or titanium alloy, stainless steel, magnesium or magnesium-based alloy, graphite, gold, silver or other metals suitable for intraoral use, a shape memory alloy, shape memory polymer, or combinations thereof. The strip or cable 210 may include one or more suspension members 216 having a connector 218 connecting the strip or cable 210 to the suspension members 216. Here, the covering 206 should include a biocompatible material that has elastic properties to be able to tolerate the expansion introduced by the motor driven cog system 202.

If the motor is an EMF motor, then other materials used in the pressure application system could have ionic properties that result in expansion.

The second aspect of the pressure application system 200 is the incorporation of a shape memory alloy and/or shape memory polymer in the covering 206 itself. In one embodiment, the shape memory material is thermally activatable. The covering 206 can include a ratio of SMAs and/or SMPs that have a variety of glass transition temperatures or shape transition temperatures (Ttrans) so that varying degrees of stiffness (thereby creating different degrees of pressure) are possible by activation on one or more thereof. In one embodiment, the SMP is one with a high glassy elastic modulus (>37 degrees) that can hold memory shape inside the human body. The SMP can be extruded using 3D printing. The polymer is thus deformed using temperature above Ttrans and then the shape is held after cooling below Ttrans. In such an embodiment, the suspension members 216 and connectors 218 can have thermal conductive properties or define or include an aqueduct for flow of heated fluid to activate the shape memory material. In one embodiment, a flow of warm saline is the fluid that flows through the suspension members 216 and the connectors 218 and can raise the temperature of the SMP, rending it moldable, and then removal of the warmth by removing or aspirating the warm saline or by circulating cooler saline to set the molded shape. This can be used for the covering 206, a palatal patch, or any other configuration of an oral medical device to change the shape thereof in response to growth or movement of teeth and/or bone.

In one embodiment, the covering includes a mixture of shape memory polymers, with at least one having a transition temperature of 40° F. and another at body temperature. This permits controlled expansion. Example shape memory polymers comprise polyethylene, trans-polyisoprene, and styrene-butadiene co-polymers.

Also, the covering 206 can include a biomedical or biocompatible resin that has elastic properties and/or differential thickness thereof at preselected areas relative to the application of pressure to the treatment site. The differential thickness is determined relative to the structure and density of a bone or other feature of a treatment site in need of healing to map greater thicknesses relative to an area in need of more pressure than a second area proximate thereto. The areas of increased thickness can be resin alone or can include a metal component or the shape memory alloy or shape memory polymer.

Turning now to FIG. 7, in another embodiment a pressure application system 300 illustrates a combination system for pressure application, but either of the systems described below can be present alone as well. The first aspect of the pressure application system 300 is a mechanical axial motor system 302 that engages a plurality of linkages 308 one each operatively connected to a rod 310 connected directly or indirectly to the treatment site. In this example, a maxillary tooth or gingival covering 306 is present, which that can have a palatal covering portion 307. The mechanical axial motor system 302 is positioned proximate the palate at an appropriate location for operative activation of the rods 310. The motor 305 of the system is operatively connected to the axial rotor 309 to axially rotate and increase the length of the rods 310 via linkages 308, thereby applying pressure to the treatment site. Here, the covering 206 should include a biocompatible material that has elastic properties to be able to tolerate the expansion introduced by rods 310. The motor 305 can be a piezo electric motor, an EMF motor, or any other standard type of motor of suitable size for the oral cavity. The rods 310 can be made of titanium metal or titanium alloy, stainless steel, magnesium or magnesium-based alloy, graphite, gold, silver or other metals suitable for intraoral use, a shape memory alloy, shape memory polymer, or combinations thereof. The rods 310 can be cables, wire, or tubing of any biocompatible material.

The system 302 can also include a reservoir 312. The reservoir 312 can store fluid, chemical actives, energy, or house a generator for activating the rods 310. The rods 310 can be or include a conduit to carry fluids from a centrally located pump attached to a reservoir (which can mechanically or otherwise heat, cool, expand or contract the carried agent) to the treatment site, for application of pressure or as a dispenser thereof. The rods 310 can be made of a material or include a material that can carry or transmit electrical energy, thermal energy to the treatment site. The rods 310 can be integrated into one of the layers of the polymeric nanocomposite treatment portion 22 of FIG. 1.

The second aspect of the pressure application system 300 is the incorporation of a shape memory alloy and/or shape memory polymer in the covering 306 itself. In one embodiment, the shape memory material is thermally activatable. The covering 306 can include a ratio of SMAs and/or SMPs that have a variety of glass transition temperatures or shape transition temperatures (Ttrans) so that varying degrees of stiffness (thereby creating different degrees of pressure) are possible by activation on one or more thereof. In one embodiment, the SMP is one with a high glassy elastic modulus (>37 degrees) that can hold memory shape inside the human body. The SMP can be extruded using 3D printing. The polymer is thus deformed using temperature above Ttrans and then the shape is held after cooling below Ttrans. In such an embodiment, the rods 310 can have thermal conductive properties or define or include an aqueduct for flow of heated fluid in a circulatory loop to and from the reservoir 312 to activate the shape memory material. In one embodiment, a flow of warm saline is the fluid that can raise the temperature of the SMP, rending it moldable while sequentially flowing cooler saline can set the SMP. This can be used for the palatal covering as well.

In one embodiment, the covering 306 includes tooth impressions 320 that define partition walls 322 between immediately neighboring teeth. Each partition wall 322 can include a mixture of shape memory polymers. In one embodiment, the mixture of shape memory polymers includes at least one having a transition temperature of 40° F. and another at body temperature. This permits controlled expansion of the partition walls 322. Example shape memory polymers comprise polyethylene, trans-polyiso-prene, and styrene-butadiene co-polymers.

Also, the covering 206 can include a biomedical or biocompatible resin that has elastic properties and/or differential thickness thereof at preselected areas relative to the application of pressure to the treatment site. The differential thickness is determined relative to the structure and density of a bone or other feature of a treatment site in need of healing to map greater thicknesses relative to an area in need of more pressure than a second area proximate thereto. The areas of increased thickness can be resin alone or can include a metal component or the shape memory alloy or shape memory polymer or a hybrid of metal and polymer.

In the embodiments described above, full teeth coverings are exemplified in the drawings, but the invention is not limited thereto. The teeth covering or gingival coverings may, in fact, be just partial coverings, covering or the length of just 2-5 teeth or even a single tooth. The number of teeth covered may be different for the right and left side of each piece. This will provide therapeutics for individuals who have a mouth that is too small (micrognathia) to fit an entire bulky device. For most user's the left side and the right side will be mirror images, but if the user has a difference in jaw and/or facial structure making one side different from the other, the device can be custom shaped to accommodate the differences.

In a third embodiment, the application of pressure can be accomplished by a bladder and reservoir system. In a fourth embodiment, the application of pressure can be accomplished by removably, replaceable sequentially sized and shaped coverings. In a fifth embodiment, the application of pressure can be accomplished by a manual turnkey and wire system.

The pressure applied to the treatment site can be constant or pulsed. The pressure can be applied intermittently, for short periods of time, such as 5 minutes up to four hours, or for long periods of time such as four hours up to twelve hours or more as prescribed by a medical professional. One example of intermittent use is the application of pressure only during sleep, for four to eight hours, and it can be constant or pulsed during this intermittent period of time. Both examples of pressure application are suitable for providing progressively increasing pressure to stimulate directional bone, cartilage, and soft tissue growth. Sequential or simultaneous incremental pressure application is done over a period of hours to days to create stress on bone and thus direct growth and bone density in a certain area or direction of bone. This may depend on the location of fracture and the amount of stress the bone or teeth will be subjected to once functionality is restored.

Flange and Drivers to Treat Sleep Apnea

Figure 12:
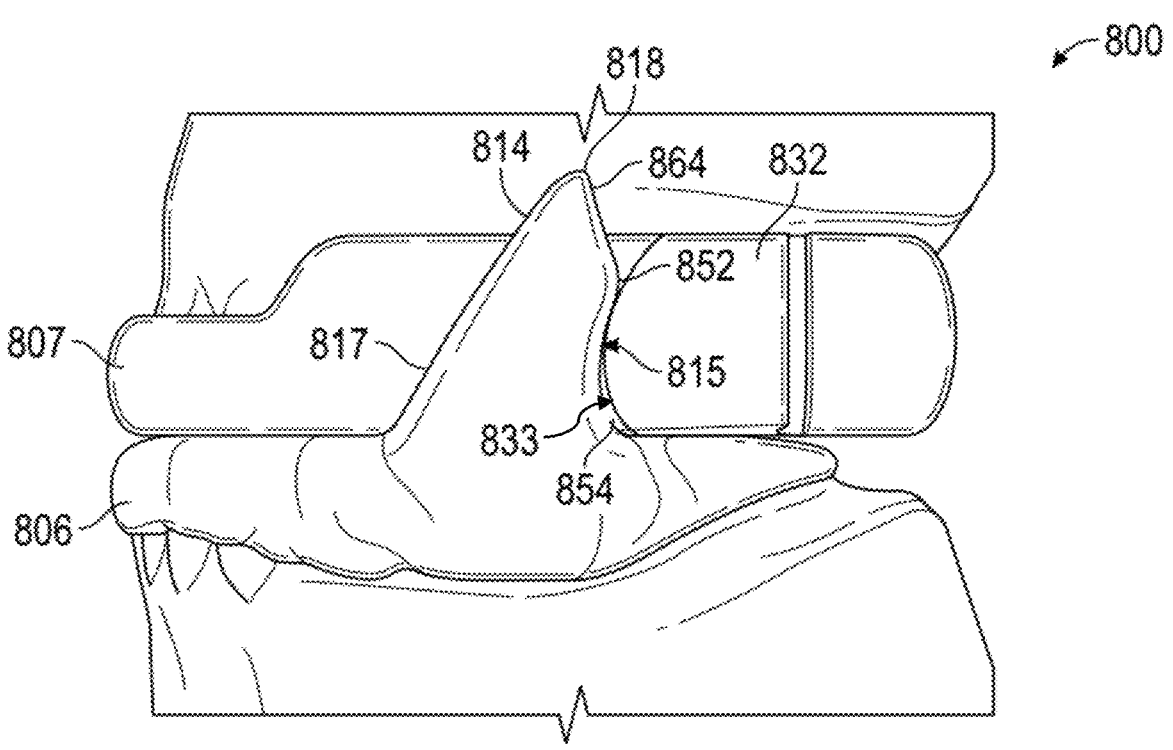
FIG. 12 is an embodiment of the medical device implemented as an oral applicant having a mandibular teeth covering with a protrusive flange and a maxillary teeth covering with a driver for the protrusive flange.

Turning now to FIG. 12, the medical devices disclosed herein can include a protrusive flange 814 when the anchoring body is a mandibular teeth covering 806 and a maxillary teeth covering 807 that has a driver flange 832 for mating with the protrusive flange. The protrusive flange 814 and driver flange 832 are shaped and constructed as disclosed in co-pending U.S. application Ser. No. 17/366,421, filed Jul. 2, 2021, which is incorporated herein by reference in its entirety. These flanges, when in operative mechanical interaction, advance the tongue, mandible and the hyoid bone in an antero-superior direction, which is configured to increase the area of the airway while awake or asleep. While asleep, this will treat sleep apnea. While awake, it can improve breathing and oxygen intake during exercise or other physical activities. These flanges and teeth coverings, collectively, are referred to as a mandibular repositioning device (MRD) 800. Here, the protrusive flange 814 has a concave-to-convex curvature moving from the base to the most cranial point 818 of the posterior side 815 (or trailing edge) of the protrusive flange 814 and a convex curvature of the anterior side 833 (leading edge) of the driver flange 832. Cranially above the concave portion is the convex section 852 of the protrusive flange 814. While FIG. 12 shows the left side of the MRD 800, it is understood that the right side can be the same. The protrusive flange 814 extends cranially from the mandibular piece 804 and the driver flange 832 protrudes laterally outward from the side of the maxillary piece 802 a distance sufficient to engage the posterior side 815 of the protrusive flange 814 with the anterior side 833 thereof. The protrusive flange 814 and the driver flange 832 are not shown in this embodiment to have the housings with the motor and mechanism of FIG. 1 or for moving the flanges as described in the co-pending application, but they are equally usable with such mechanisms and all the systems described herein.

In the embodiment of FIG. 12, the leading edge 817 of the protrusive flange 814 is generally linear but is oriented titled posteriorly with the most cranial point 818 pointed toward the temporomandibular joint (TMJ). Also, the posterior side 815 has an optional back-cut portion 864 of the convex portion 852 at a position proximate the most cranial point 818, which is back-cut toward the cranial point 818.

Methods of Use

Figure 9:
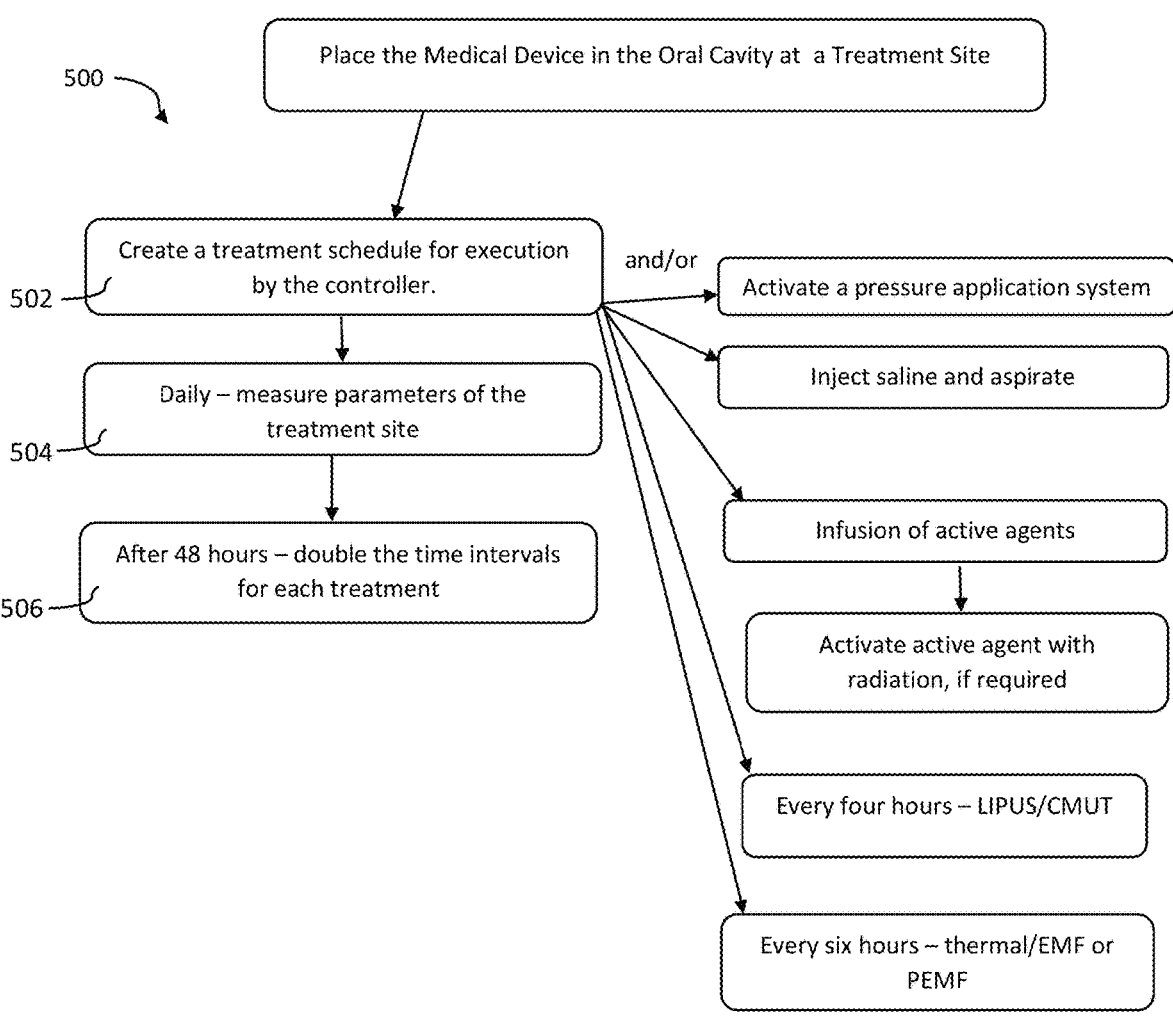
FIG. 9 is a flow chart proposing various methods of treatment for a treatment site using the medical devices disclosed herein.

With reference to the flowchart of FIG. 9, methods 500 of treating a treatment site using the medical devices described herein are presented in the form of a flow chart. The medical device is placed in the oral cavity of a user and a treatment schedule is executed. A controller on board the medical device or external to the medical device can be configured, via software stored in its memory or via instructions communicated from an external device thereto, to provide selective local, focal, or generalized interventions based on changing growth measured for the treatment site, including growth of bone and/or tissue in the oral cavity. The controller is configured to execute a treatment schedule 502, which can include any one or more of the treatments discussed herein. For example, the treatment schedule can include one or more of activation of the pressure application system, infusion of active agents, activation of the activation agent if required, a first periodic application of LIPUS/CMUT, a second periodic application of thermal of EMF (regular or pulsed), injection of saline, aspiration of the treatment site, infusion of an antibiotic, etc.

When a CMUT sensor is present in the oral cavity, whether part of the medical device or independent therefrom, the treatment can include application of non-invasive low intensity ultrasound through an array of such CMUT sensors. Simultaneous or independent application of CMUT using 1D, 2D or 3D can stimulate multidirectional bone and soft tissue growth. The method of treatment can include simultaneous or independent application of EMF/PEMF to stimulate directional or multidirectional bone growth.

The method can include local application of an active agent via the medical device as described herein with respect to at least FIG. 1 above. The active agent can include growth hormone for promoting bone and soft tissue growth. Example actives include recombinant human growth hormone (rhGH) and human insulin like growth factor I. These can be administered as a liquid or aerosol, powder, gas, or any other physical state that is suitable for such application or using rhGH-doped carbon dot (rhGH-CD-CL being an example) that is activated with UV energy after delivery, all being executed individually or in combination (simultaneous or sequential). In another embodiment, the active agent includes antibiotic. The controller operatively controls the administration of any active agent. The administration to the target site can be diffuse, selective, or focal. In one embodiment, the controller is configured to deliver rhGH at onset of sleep.

In some embodiments, the method of treatment can include administration of an oral active agent or one that is absorbed through the lungs. Here, the active agent can include vitamins, antibiotics, anti-inflammatories, pain killers, NSAIDS. In one embodiment, the vitamin is vitamin D 3.

In one embodiment, the application of EMF or PEMF is combined with ultrasound application (selective or diffuse application thereof), pressure application, and administration of growth hormone, insulin like growth hormone factor and vitamins. The application of the ultrasound can be on a schedule of constant or differential doses over a prescribed time period, especially for areas of a treatment site that require more growth than other areas. The controller's microprocessors can include software configured to calculate the amount, intensity, and duration of the ultrasound application to the treatment site, in particular based on parameters sensed at the treatment site by the any one or more of the various sensors. In one embodiment, the controller is configured to implement PEMF treatments before implementing pulsed CMUT and pulsed pressure therapy.

In some embodiments, the method includes delivery of a one or more medicaments that is synergistic with the ailment of the treatment site. The controller of the medical device can dispense the one or more medicaments at predetermined times based on circadian rhythm manifestations of medical problems, or in a manner that minimizes the dose and duration of treatment needed to achieve therapeutic goals.

In one embodiment, the CMUT is used to assess size of a hematoma or differential bone density etc. As such, the CMUT is being used as a receiver for the transfer of signals/data back to the controller, thereby providing a feedback loop. The controller can be configured to determine fracture alignment from the CMUT signal/data, which can then be used by the controller to adjust or implement pressure application to the treatment site. The preferential pulse-carrying insulated CDT's/CNT's will transfer continuous or pulsed ultrasound depending on application. The intensity of ultrasound and wavelength will be determined by need such as strength and penetrating distance. Other technology to transfer ultrasound energy such as polymer coated metal or non-metal, fiberoptic or light transmitting material (LED's) or sound transmitting channels (US transmission) can be included in the medical devices described herein.

The treatment schedule can include a daily measurement of parameters 504 at the treatment site. The measurement can be from sensors included in the medical device or independent thereof. The treatment schedule can include incremental time intervals for application of any one or more of the treatments 506. In one embodiment, the treatment schedule includes increasing the time interval between treatments after a preselected time period, e.g., doubling the time interval for each treatment after 48 hours.

The sequence of treatments and data from sensor measurements can be stored using blockchain technology and NFTs or stored in localized memory of a CPU in the medical device or a controller or controller station. This data can utilize Web3 and Decentralized Finance (DeFi) or conventional methods to log each process and its associated billing in the hospital system or healthcare facility so as to provide error-free charging of financial aspect of the technology and its use to third party insurers and payors Controller Turning now to FIGS. 10 and 11, a controller station 600 is illustrated for operatively controlling any of the medical devices 10, 200, 300, 400 described above, which together define a system 601. The controller station 600, as labeled in FIG. 11, has a housing 601 defining a first charging unit 602 for receipt of any of the medical devices and a second charging unit 604 for receipt of a second of any of the medical devices if two are needed for the treatment. The first and second charging units 602, 604 may be receptacles defined in a surface of the housing 601. In another embodiment, the first and second charging units 602, 604 may be generally flat plates. The housing 601 can have a display screen 603 for displaying information to a user and one or more ports 606 for connecting the charging station to power, to other devices, and/or the internet. Alternately, instead of ports 606, the housing 601 can enclose wireless communication technology for other devices 610, for example, but not limited thereto, a printer, speakers, tablets, laptops, cellular phones, smart watches, and other cloud-based devices shown in FIG. 10. The controller station 600 may include sensors to record ambient room conditions, such as light, temperature, humidity, noise/sound, etc. The controller station 600 optionally is battery powered and may include a rechargeable battery. The controller station 600 may be portable. Alternately, rather than having the first and second charging units integrated into the controlling station 600, a separate charging station (not shown) having a first and second charging unit is possible. The charging station may be portable.

When the charging station is separate from the controller station 600, the controller station may be incorporated into a hand-held smart device and such a smart device would share blue tooth, WIFI, Video, audio, and communication capability with sensors. In one embodiment, the controller can be a proprietary software program for use with or an App (software application) having full functionality to function like the controller station 600. System 601 and controller station 600 in all embodiments will be HIPPA and HITECH compliant for purpose of medical privacy. The system 601 can interface with a wide variety of electronic health formats, thereby enabling the system and controller station 600 to be available for real-time data download and upload, active health care worker involvement in user's health care needs, including reviewing and adjusting any treatment being implemented by the medical device in real-time as well.

The controller station 600 encloses a circuit board having a microprocessor, including memory (non-transitory computer readable media) in which is stored firmware and learning algorithms, having a receiver of electronic communications, and having a transmitter of electronic communications, including wireless communication capabilities to electronically communicate with the medical device for real-time communications with the sensors 32 and integrated circuits of FIG. 1. The controller station 600 can transmit instructions to the microprocessors/integrated circuits of the medical devices described herein, which implement the instructions to increase or decrease application of pressure via the pressure application system.

The controller 600 is configured to use blockchain technology. For example, the blockchain can be used to record data, provide continuous tracking of the data (provides an immutable ledger of the data collected in real time. Some of the data collected includes images, tissue temperatures, tissue pressure, arterial doppler ultrasound blood flow characteristics, venous blood flow and clot formation, bone callus formation, bone strength, bone alignment imaging.

All the data that is available to every sensor will be stored in the system memory or in the blockchain technology, as discussed above. The system memory is non-transitory and may be present in the polymeric nanocomposite treatment portion of any of the medical devices described herein, the controller, or sent to an external memory device, such as a cloud server or one connected to the cloud server, for storage as shown in FIG. 10. If the external memory device is used, the data will be wirelessly transferred thereto and can be transferred or directly stored in a Cloud based database. The stored data can be accessible by or transferred to a medical processional. In one embodiment, the data is accessed through a smart app downloadable to an electronic device 610, such as a cell phone, tablet, computer, etc. The medical professional can assess satisfactory growth and alignment of bones. This is critical as the healing process is going to be accelerated and a 6-10-week timeline will very likely be reduced to 2-3 weeks. Decision to change any component of the method of treatment can be followed by remote, algorithmic, or manual transmission to the external controller station and from there or directly to the controller 16 of the medical device 10, for example from FIG. 1. This data will be used to adjust the method of treatment, such as synchronization of EMF/PEMF and pressure pulse or continuous pressure applications or both thereof synchronized with CMUT or dispensing of an active agent.

The devices and methods of treatment disclosed herein accelerate healing such that a typical 6 to 10 week healing period under standard treatment methods is shortened to 1 to 3 weeks.

All processes related to this invention can use blockchain technology and NFT's (non-fungible tokens) in the computing process of the controller so as to create an immutable ledger of all events. Such data recording shall also direct or activate processes through artificial intelligence and/or robotics to perform all tasks and follow all algorithms and commands in an error-free environment. The record-keeping of the blockchain and NFTs will be available to the controller, the medical device, the cloud, a patient's medical electronic health record, mobile electronic devices (such as cell phone, tablets, laptops, watches, etc.), mobile APP's, etc. This data utilizes Web3 and Decentralized Finance (DeFi) or conventional billing methods to log each process and its associated billing in the hospital system or healthcare facility so as to provide error-free charging of financial aspect of the technology and its use to third party insurers and payors.

The devices and methods of treatment disclosed herein accelerate healing such that a typical 6 to 10 weeks or longer healing period under standard treatment methods is shortened to 1 to 3 weeks.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention. Having described the invention in detail and by reference to preferred embodiments thereof, it will be apparent that modifications and variations are possible without departing from the scope of the invention which is defined in the appended claims.

What is claimed is:

1. A medical device comprising:
a polymeric nanocomposite treatment portion configured for contact with a treatment site within an oral cavity of a user and configured for operative communication with a controller, the polymeric nanocomposite treatment portion comprising:
a mucosal contact layer comprising a biocompatible polymer and defining a plurality of pores therethrough;
a continuous support layer comprising a biocompatible polymer;
an electronic network layer between the mucosal contact layer and the continuous support layer; and
a means for applying pressure to the treatment site;
wherein the electronic network layer is adapted to be in operative communication with the controller and a power source, and the electronic network layer comprises carbon nanostructures, and a quantum microchiplet (QMC) or an octagonal quantum microchiplet integrated with a photonic integrated circuit; and
a pressure sensor adapted to be positioned at the treatment site that measures growth pressure at the treatment site.

2. The medical device of claim 1, wherein the polymeric nanocomposite treatment portion is a palatal patch configured for direct connection to a surface of the user's oral cavity.

3. The medical device of claim 1, further comprising an oral cavity anchoring body having a housing enclosing a controller and a power source in operative communication with the controller.

4. The medical device of claim 3, wherein the oral cavity anchoring body is selected form the group consisting of a tooth covering, a maxillary teeth covering, a mandibular teeth covering, a gingival covering, a covering over the face and/or lips having the polymeric nanocomposite treatment portion insertable in the oral cavity in contact with an intraoral surface, an endotracheal tube.

5. The medical device of claim 3, wherein the polymeric nanocomposite treatment portion extends from the oral cavity anchoring body.

6. The medical device of claim 1, wherein the support layer comprises a matrix variable density polytetrafluoroethylene.

7. The medical device of claim 1, wherein the polymeric nanocomposite treatment portion further comprises a secondary support layer between the mucosal contact layer and the electronic network layer, and the secondary support layer comprises a matrix variable density polytetrafluoroethylene.

8. The medical device of claim 1, wherein the layers of the polymeric nanocomposite treatment are 3D printed layers.

9. The medical device of claim 1, wherein the means for applying pressure comprises a motor driving an actuator; an electromagnetic force driven cable system; or a fluid-tight bladder and fluid dispenser system.

10. The medical device of claim 1, wherein the means for applying pressure comprises removably, replaceable sequentially sized and shaped teeth covering, a manual turnkey-wire system, a rotational motor activating wires arranged for radial expansion of the palatal arch, or radial wires integrated into one of the layers of the polymeric nanocomposite treatment portion.

11. The medical device of claim 1, wherein the electronic network layer comprises one or more of a sensor module, an electromagnetic field module, robotics module, an intravascular ultrasound module, and a vacuum module.

12. The medical device of claim 11, wherein the sensor module comprises one or more of a capacitive micromachined ultrasonic transducer (CMUT), a complementary metal-oxide-semiconductor (CMOS) based sensor, an infrared sensor, a fiberoptic sensor, a radioisotope sensor, a temperature sensor, and a pressure sensor.

13. The medical device of claim 1, wherein the polymeric nanocomposite treatment portion further comprises one or more of a sensor module, an electromagnetic field module, a CMUT module, UV emitting module, robotics module, an intravascular ultrasound module, and a vacuum module as a discrete layer interleaved by juxtaposed layers of carbon nanostructures positioned above or below the electronic network layer.

14. The medical device of claim 13, wherein each discrete layer is in operative communication with the electronic network layer.

15. The medical device of claim 1, wherein the oral cavity anchoring body is removably, replaceably attachable to the polymeric nanocomposite treatment portion and includes a connection plug or port for connection to the electronic network layer of the polymeric nanocomposite treatment portion.

16. The medical device of claim 1, wherein the pressure sensor is an f-carbon dot nanoparticle-based hydrogel.

17. A method of promoting bone growth in the oral cavity, the method comprising:

seating a medical device according to claim 1 in a user's oral cavity;

sensing pressure at the treatment site and sending sensed data to the controller; wherein the controller is configured to activate the means for applying pressure when the sensed data equals a pressure indicative of a threshold amount of bone growth; and activating, via the controller, the means for applying pressure at the threshold amount of bone growth;

wherein the sensing and activating are in a repeatable feedback loop.

18. The method of claim 17, wherein the medical device comprises a plurality of pressure sensors, one each in registration with each individual tooth in the mandible, maxillary, or both.

19. The method of claim 17, wherein the medical device comprises transmitting data from the controller to an external electronic device.

\* \* \* \* \*